United States Patent [19]

Rogerson

[11] Patent Number: 5,342,081
[45] Date of Patent: Aug. 30, 1994

[54] AIR BAG MODULE WITH TOP MOUNTED BAG

[75] Inventor: William Rogerson, Rochester, Mich.

[73] Assignee: AlliedSignal Inc., Morristown, N.J.

[21] Appl. No.: 55,648

[22] Filed: Apr. 30, 1993

[51] Int. Cl.$^5$ .................. B60R 21/20; B60R 21/26
[52] U.S. Cl. .................. 280/728 A; 280/740
[58] Field of Search .......... 280/728 A, 728 R, 728 B, 280/730 R, 732, 743 R, 737, 736, 742, 741, 740; 248/99; 220/404

[56] References Cited

U.S. PATENT DOCUMENTS

| 4,111,457 | 9/1978 | Kob et al. ............ | 280/728 A |
| 5,184,843 | 2/1993 | Berger et al. .......... | 280/728 A |
| 5,186,492 | 2/1993 | Wright et al. .......... | 280/728 A |

FOREIGN PATENT DOCUMENTS

| 0422840 | 4/1991 | European Pat. Off. ........ | 280/728 R |
| 0529304 | 3/1993 | European Pat. Off. ........ | 280/728 A |
| 2443267 | 3/1975 | Fed. Rep. of Germany ...... | 280/741 |
| 4356247 | 12/1992 | Japan ............... | 280/728 A |

Primary Examiner—Margaret A. Focarino
Assistant Examiner—Peter English
Attorney, Agent, or Firm—Markell Seitzman

[57] ABSTRACT

An air bag module (10) having a housing 12) having an open end (14) defined by first (20) and second (22) side walls and first (30) and second end walls (32); the first and second side walls and first and second end walls, proximate the open end, each comprising an extending boss (40a-d), each boss (40a-d) comprising at least one slit (42), each slit at a lower portion thereof including an enlarged portion (44); an air bag (50) including an inlet portion (52) approximately the size and shape of the housing open end (14), the air bag proximate ends of the inlet portion being formed with looped portions, each looped portion being inserted within a slit (42) in a corresponding boss (40a-d); a plurality of bars inserted within each looped portion of the air bag after the looped portion is within a designated slit, for preventing the looped portion from being dislodged therefrom; a cover (100) including a top (102) having a frangible tear portion (104) torn open upon inflation of the air bag, side walls (106a-d) and a lip portion (108) extending inwardly from each side wall (106a-d), the cover (100) fitted to the housing supporting each looped portion and bar within a corresponding slit.

7 Claims, 1 Drawing Sheet

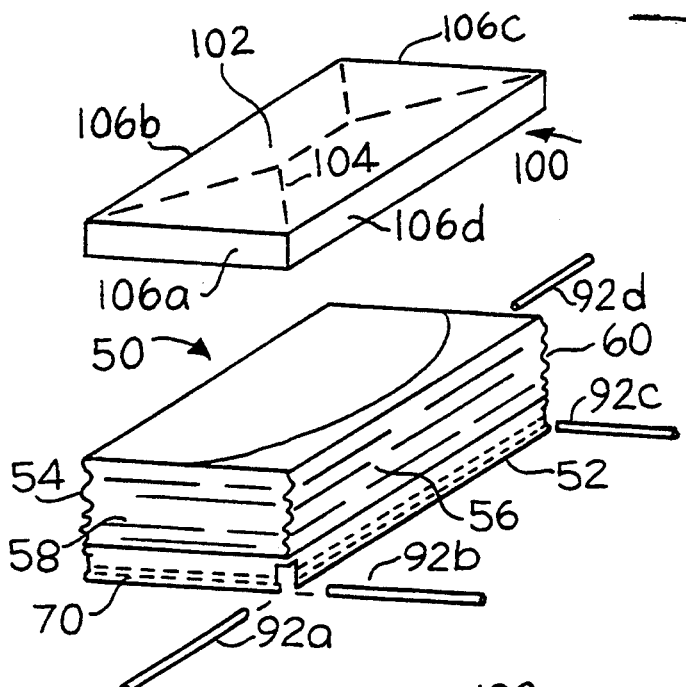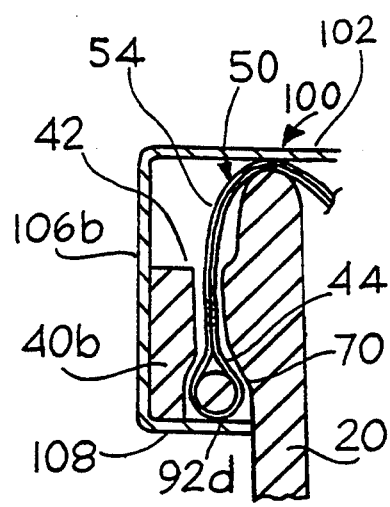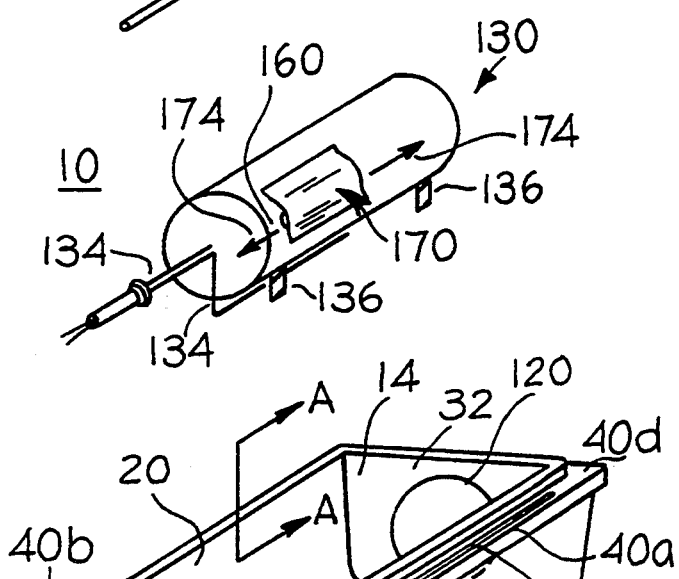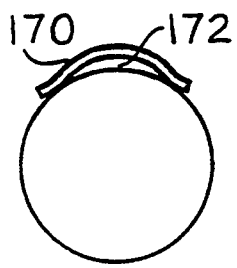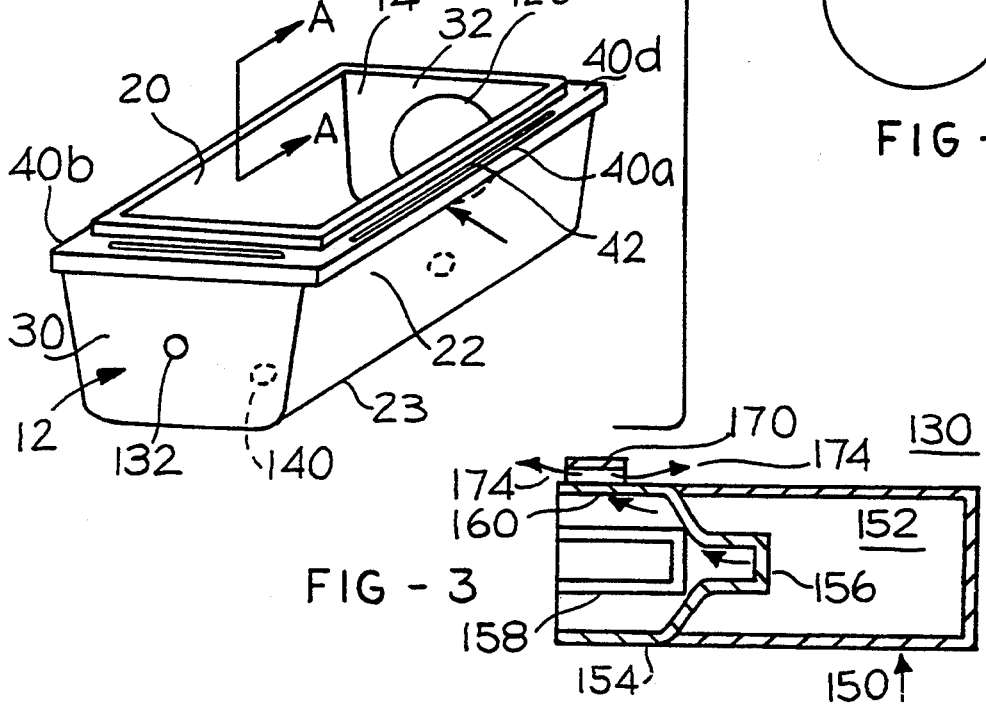

AIR BAG MODULE WITH TOP MOUNTED BAG

BACKGROUND AND SUMMARY OF THE INVENTION

The present invention generally relates to an air bag module for a motor vehicle safety restraint system.

An air bag module typically comprises a housing in which it secures an inflator. An air bag is often mounted about the inflator or alternatively to the housing. A cover is positioned about the housing to protect the air bag. The present invention provides a unique assemblage of components forming a module permitting easy assembly.

One of the features of the present invention is that an air bag may be attached directly to a housing. One such prior art device is shown in the commonly owned U.S. Pat. No. 5,069,480. Accordingly, the invention comprises: an air bag module comprising a housing having an open end defined by first and second side walls and first and second end walls; the first and second side walls and first and second end walls, proximate the open end, include an extending boss. Each boss comprises at least one slit and each slit, at a lower portion thereof, includes an enlarged portion. The module additionally includes an air bag including an inlet portion having first and second side panels, and mating first and second end panels. The end of each side panel is provided with a looped portion of material. Each looped portion of each side and end panel is inserted within a slit in a corresponding boss. Means, such as a bar, is inserted within each looped portion of the air bag after the looped portion is in its slit, to secure the air bag to the housing. A cover protects the air bag and includes a top having a frangible tear portion that is torn open upon inflation of the air bag. The cover also includes side walls and a lip portion extending inwardly from each side wall. The cover is fitted to the housing and secures the looped portion of the air bag and bars in place within a corresponding slit.

Many other objects and purposes of the invention will be clear from the following detailed description of the drawings.

BRIEF DESCRIPTION OF THE DRAWINGS

In the drawings:

FIG. 1 illustrates an assembly view showing many of the major components of the present invention.
FIG. 2 illustrates a partial cross-sectional view.
FIG. 3 shows a hybrid inflator.
FIG. 4 is an end plan view showing a deflector.

DETAILED DESCRIPTION OF THE DRAWINGS

With reference to FIGS. 1 and 2, there is shown, an air bag module 10 comprising a housing 12. The housing 12 includes an open end 14 defined by first 20 and second 22 sidewalls and first 30 and second 32 end walls. In the preferred embodiment of the invention, the housing is molded from a material such as Capron manufactured by AlliedSignal Inc. Further, in the preferred embodiment of the invention, the first and second side walls 20 and 22 respectively are of integral construction and form a bottom 23 of the housing 12. As can be seen in FIG. 1 and in greater detail in FIG. 2, the first and second side walls 20 and 22 and first and second end walls 30 and 32, proximately the open end, include an outwardly extending shoulder or boss 40a–d. Each boss 40a–d comprises at least one slit 42 or a series of spaced slits. The lower end of each slit 42 is formed with an enlarged diameter portion 44 or pocket.

Secured to the housing 12 is an air bag 50 of general construction as known in the art. The air bag 50 includes an inlet portion 52, often referred to as a neck portion in the industry, defined by a first 54 and second 56 side panel and mating first 58 and second 60 end panels. While not shown in the figures, the neck portion of an air bag is its narrowest part. The end of each side panel and end panel is formed with a stitched loop construction forming a loop portion 70. As can be seen in FIG. 2, each loop portion 70 is inserted within a corresponding slit 42. It should be appreciated that if the slit is formed by a series of spaced openings, the looped portion would be formed as a series of looped sections capable of fitting into the spaced opening. As will be seen from the description below, the means by which the air bag 50 is secured to the housing 20 is by utilizing a plurality of thin metal or plastic rods 92a–d. The looped portion 70, on each side of the air bag inlet portion 52, is first placed within a corresponding slit 42. Each looped portion 70 is initially positioned below the large diameter section 44 of its slit 42 and below the corresponding boss 40a–d. With the air bag in this position, a rod 92a–d is inserted through each looped portion 70. Thereafter the air bag 50 is urged upwardly bringing with it all of the loop portions 70 and rods 92a–d so that the rods lie within the larger diameter portions or pockets 44 formed in the slits 42. With the air bag 50 positioned atop the housing 12, the air bag may be folded using any known technique into the compact package as diagrammatically illustrated in FIG. 1.

The module 10 further includes a cover 100 which includes a top 102. The top includes a frangible tear seam 104 which is torn open upon inflation of the air bag. Typically, air bag module covers are fabricated using a molded plastic material. The cover 100 further includes side walls 106a–d. Each side wall 106a–d includes an inwardly extending lip portion 108. After the air bag is folded and positioned atop the housing, the cover 100 is fitted to the housing 12. As generally shown in FIG. 2, each lip portion 108 is fitted about a corresponding one of the bosses 40a–d. In the position shown on FIG. 2, the cover lip portion 108 maintains the rods 92a–d and looped portions 70 of the air bag in place. The lip portions 108 and/or side walls 106 may be secured to the bosses 42 by fasteners, adhesive or by sonic welding.

Reference is again briefly made to FIG. 1. As can be seen, the end wall 32 includes an enlarged opening 120, while end wall 30 includes a smaller opening 132. Upon assembly of the module 10 an inflator, generally shown as 130, may be inserted within the opening 120 and thereafter secured to the housing 12. The inflator 130 will typically include one or more sets of wires 134 extending from one or both of its ends. These wires 134 will be fed through the smaller opening 132. There are many different ways to attach an inflator, such as 130 to an associated housing, such as 12. One such method may include using mounting studs 136 which extend from a portion of the inflator through corresponding openings 140 in the bottom 23 of the housing 12. Alternately the inflator may be secured in place using bands as shown in the commonly assigned U.S. Pat. No. 4,964,654 which is incorporated herein by reference.

The inflator is thereafter secured to the housing by a nut or similar fastener threadably engaging each mounting stud 136 or similar component.

As it is known in the ark, inflators for air bag safety restraint systems typically fall into two categories, the first utilizing a solid propellant such as sodium azide which generates an inert gas upon activation. The second type of inflator is known as a hybrid inflator which utilizes a stored quantity of the inert gas that is controllably released and heated to inflate the air bag. One such hybrid inflator is illustrated in U.S. Pat. No. 5,076,607 which is incorporated herein by reference. FIG. 3 shows the construction of a hybrid inflator such as 130. Many of the elements shown in FIG. 3 are known in the prior art. A hybrid inflator typically includes a pressure vessel 150 in which is stored a quantity of inert gas 152 such as Argon. One side of the pressure vessel is closed by a gas generator portion 154, one end of which includes breakable disc 156. The generator portion 154 includes or supports means 158 used to open the disc 156 permitting the stored gas 152 to exit through a plurality of exit ports 160. The ports are typically arranged such that the exiting, pressurized gasses create a zero resultant force vector. An inflator which generates a zero resultant force vector is often referred to as a thrust neutral inflator. The means 158 may include a pyrotechnic element used to melt the disk 156 or a sliding piston member that is propelled through the disk 156 to open same. In the present invention, the inflator 130 shown in FIG. 3 is substantially identical to that shown in the above-referenced U.S. patent with the exception that only a single exit port 160 is utilized. The use of the single port 160 will create a non-thrust neutral situation which is compensated for by use of a deflector 170. Secured to the inflator 130, and positioned about the exit port 160 is an axial deflector 170 which comprises a thin, relatively rigid metal plate welded to the pressure vessel portion of the inflator 130. As can be seen in FIGS. 1 and 4, the deflector 170 is arcuately shaped defining a trough 172 to direct the exiting gasses outwardly and axially along the length of the inflator 130. The exit area of the ends of the trough 172 should be equal to or greater than the area of the exit port 160. Typically this metal plate or deflector 170 may be fabricated from 1010 stainless steel. Upon activation of the inflator, the gas 152, which is pressurized and/or heated, will exit the port 160. The heated, pressurized gases, exit at a relatively high velocity impinge upon the deflector 170 and are directed axially outward in a thrust neutral manner as shown by arrows 174 in the figures. The gases exiting the inflator 130 impinge upon the housing walls 30 and 32 and are deflected outwardly inflating the air bag 50. As the air bag 50 is inflated, the pressure upon the inside of the cover 100 causes the cover to open along its tear seam or seams 104.

Many changes and modifications in the above described embodiment of the invention can, of course, be carried out without departing from the scope thereof. Accordingly, that scope is intended to be limited only by the scope of the appended claims.

I claim:

1. An air bag module (10) comprising a housing (12) having a walled portion (20,22,30,32) defining an opening (14), the walled portion including a plurality of bosses generally about at least part of the opening (14), each boss (40a–d) comprising at least one slit (42);

an air bag (50) including an inlet portion (52), the air bag proximate ends of the inlet portion being formed with looped portions, each looped portion being inserted within a designated slit (42) in a corresponding boss (40a–d);

first means inserted within each looped portion of the air bag, for preventing the looped portion from sliding out of the designated slit;

a cover (100) including a top (102), side walls (106) about the top and a lip portion (108) extending inwardly from at least one side wall (106), the cover (80) fitted to the housing supporting each looped portion and first means within a corresponding slit.

2. The apparatus as defined in claim 1 wherein the first means comprises a thin rod (92).

3. The apparatus as defined in claim 2 wherein the rod is plastic.

4. The apparatus as defined in claim 1 wherein the air bag includes, proximate the inlet portion, first (54) and second (56) side panels, and mating first (58) and second (60) end panels joining the side panels, the end of each side panel provided with the looped portion (70).

5. The apparatus as defined in claim 1 wherein the housing (12) includes first (20) and second (22) side walls and first (30) and second end walls (32) joined to the side walls, the first and second side walls and first and second end walls, proximate the opening, each comprising one of the bosses (40a–d).

6. The apparatus as defined in claim 1 further including an inflator (130) secured to the housing to inflate the air bag, the inflator (130) including a single exit port (160) and an axial deflector (170) secured about the exit port (160) to divert exiting gases away from the inflator (130) in a thrust neutral manner.

7. The apparatus as defined in claim 6 wherein the deflector includes an arcuately shaped member secured to the inflator about the exit port, the member defining a trough, in cooperation with a wall of the inflator, wherein opposite ends of the trough are open and wherein the total area of the open ends is equal or greater than the area of the exit port.

* * * * *